United States Patent [19]

Ishibai et al.

[11] 4,436,386
[45] Mar. 13, 1984

[54] BINOCULARS HOUSING

[75] Inventors: Isao Ishibai; Kunimitsu Kobayashi, both of Toyko, Japan

[73] Assignee: Hoya Corporation, Tokyo, Japan

[21] Appl. No.: 281,627

[22] Filed: Jul. 9, 1981

[30] Foreign Application Priority Data

Aug. 27, 1980 [JP] Japan ............................ 55-120507[U]

[51] Int. Cl.³ .............................................. G02B 23/18
[52] U.S. Cl. ...................................... 350/550; 350/145
[58] Field of Search ............... 350/589, 550, 555, 545, 350/556, 145, 587, 579, 318, 257; D16/133

[56] References Cited

U.S. PATENT DOCUMENTS

| | | | |
|---|---|---|---|
| 2,125,908 | 8/1938 | Frotschner | 350/318 |
| 2,510,873 | 6/1950 | Early | 350/318 |
| 3,829,194 | 8/1974 | Van Exel et al. | 350/555 |
| 4,205,894 | 6/1980 | Filpovich et al. | 350/550 |

*Primary Examiner*—Jon W. Henry
*Attorney, Agent, or Firm*—Sughrue, Mion, Zinn, Macpeak & Seas

[57] ABSTRACT

A housing for binoculars including split upper and lower housing halves which entirely protects the main body of a binoculars including the left and right optical systems, the focusing mechanism and the eyepiece adjustment mechanism. Ocular and objective lens frames project outwardly from the main body of the upper and lower halves of the housing. The two halves of the housing are joined by rings placed over the objective and ocular frames. Only an eyepiece width adjustment knob and a focusing adjustment knob or switch project from the housing so that a tight seal is provided for all internal components.

4 Claims, 4 Drawing Figures

BINOCULARS HOUSING

BACKGROUND OF THE INVENTION

Prior art binoculars have had casings made of either metal or hard plastics surrounded by a thin leather cover with this, there was a tendency for local distortion or damage to the lens casing to occur in the event of a jolt or bump to the exterior of the device. For this reason, binoculars have typically employed a relatively thick banding which is wrapped around the entire lens casing and a plastic cover on the outer surface of the main body of the binoculars, including the lens casings and focusing mechanism. The plastic cover is divided into four sections, upper, lower, right half, and left half, and is held in place with tightening screws. While it is easy to remove the banding as the banding is not firmly attached, the assembly can relatively easily be damaged.

In addition, with the utilization of tightening screws to hold in place the four pieces of the plastic cover, it is not only necessary to use many small parts but also the construction itself becomes cumbersome. Moreover, as the screws project from the surface of the device, it becomes necessary to cover them with yet another material. This construction also has the drawback of holding dust in the narrow opening formed where the joining arm is bent to change the focal distance in the right and left optical systems.

SUMMARY OF THE INVENTION

Overcoming these drawbacks, the invention provides binoculars in which the parts of the main body of the binoculars are protected by joined upper and lower sections of the split housing. Because of the unified construction of binoculars in which the upper and lower halves of the split housing are joined by rings on the objective and ocular frames which eliminates the need for tightening screws, it is possible to provide binoculars having a simplified outer design.

In accordance with the present invention, the housing which protects the parts of the main body of the binoculars is divided into upper and lower halves. The two halves are joined and made into a single unit through the provision of rings on both the ocular frames and the objective frames molded onto the edge of the housing. As a result, the use of tightening screws is unnecessary and the construction is simplified. Moreover, as the focusing and eyepiece width adjustment mechanism is contained within the housing, the there is no need for any focal adjustment structure on the exterior of the housing other than the knob or switch used for controlling the functions mentioned above. As a result, narrow openings which might allow dust to enter are formed and complete protection of the mechanism of the binoculars is assured.

DESCRIPTION OF THE PREFERRED EMBODIMENTS

Figure 1:
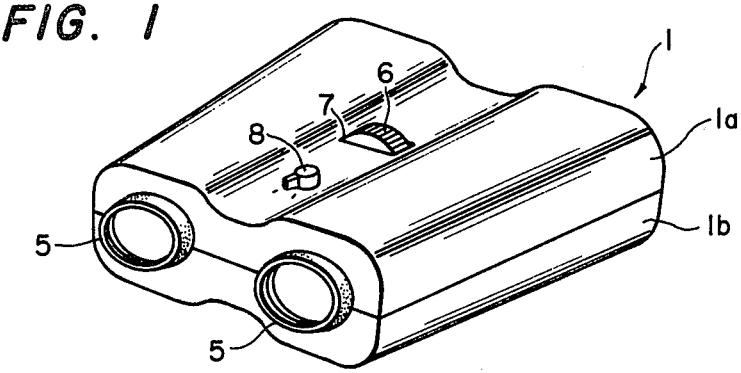
FIG. 1 is a perspective view of binoculars constructed in accordance with the invention.
Figure 2:
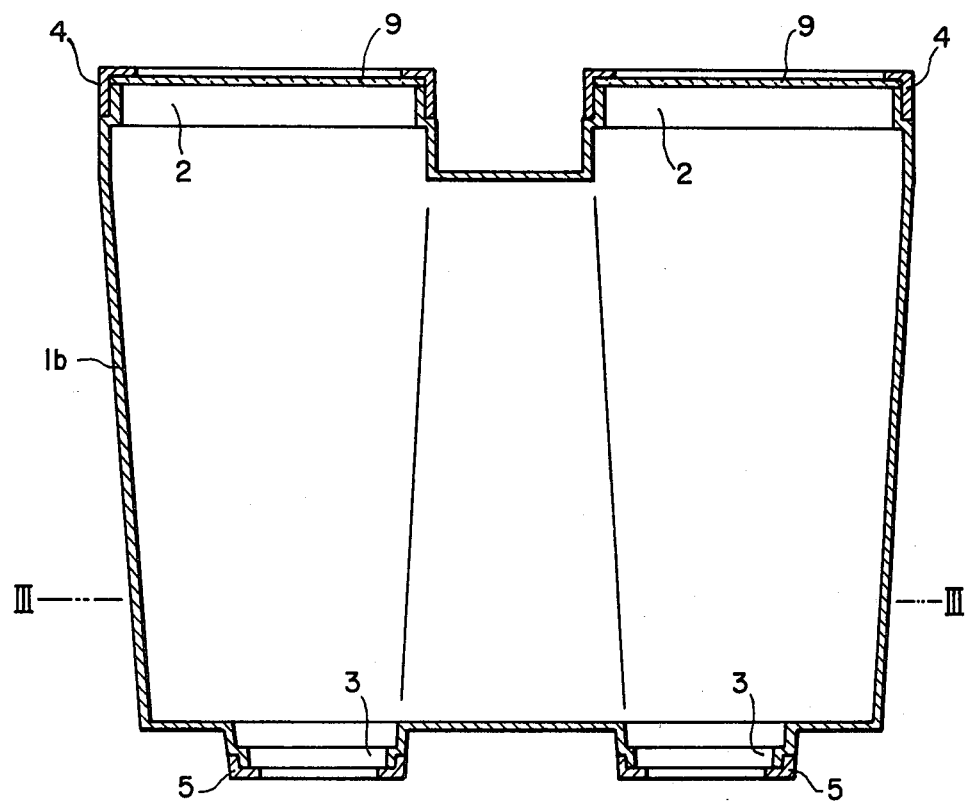
FIG. 2 is a cross-sectional view of the housing of FIG. 1.
Figure 3:
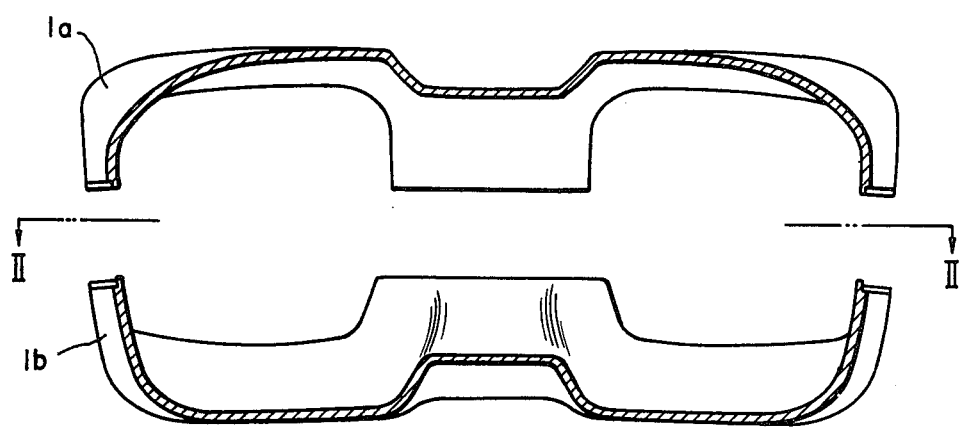
FIG. 3 is a cross-sectional view of the housing of FIG. 1 showing upper and lower sections of the housing, separated and seen from the front.

The invention will be described with reference to the drawings which show the application of the invention to binoculars incorporating an automatic focusing mechanism. Reference number 1 designates a plastic housing which protects the main body of the binoculars and which is divided into an upper half 1a and a lower half 1b. FIG. 2 shows a sectional view of the upper and lower halves including the right and left light axes. Reference number 2 designates objective lens frames molded to the surface of the housing 1, 3 indicates an ocular lens frame molded to the rear surface of the housing, and 4 and 5 are rings affixed to the objective frame and ocular frame. Reference number 6 designates an eyepiece width adjustment knob positioned at the upper half 1a of the housing and 8 is an automatic focusing mechanism operation switch. In the event that a manual focusing mechanism is employed, a knob for direct movement of the focusing mechanism will replace the switch.

Figure 4:
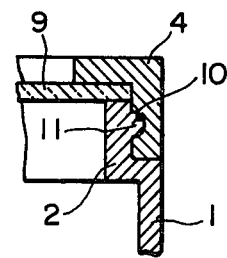
FIG. 4 is an enlarged cross-sectional view of the objective frame of the housing of FIG. 1.

The objective frames 2 are incorporated into the construction of the light opening for focusing on both right and left lens casings. The objective frames are in the shape of a cylinder having an elliptical or oval cross section. The ocular frames 3 are similarly shaped and constructed to move crosswises during ocular adjustment. In order to assemble the ocular and objective frames in a closed position, the upper and lower sections of the respective frames are pressed together. Thereupon, a bond either is applied to the upper and lower halves of the housing, or after the halves have been fitted together without chemical bonding, a ring is affixed directly to the ocular frame. As for the objective frame, as shown in the close-up view of FIG. 4, a protective glass or transparent plastic panel is provided before affixing the ring. Circular grooves are formed along the inside walls of both rings which are aligned with projections molded on the outer wall of the frames.

As described above, with the invention it is not necessary to use tightening screws for the two halves of the plastic housing on the main body of the binoculars. Instead, the sections of the housing can be simply joined, or when need be, chemically bonded together to provide a solid cover. This makes possible a simplified housing construction absolutely protecting the binoculars in the event of jolts or bumps to the exterior surfaces. Moreover, as the horizontally split housing has no focusing apparatus on its exterior other than the eyepiece width adjustment knob and focusing knob or switch, dust is prevented from entering the housing which prevents damage to the mechanism within the main body of the binoculars. In addition, due to the use of the rings affixed to the object lens frame and the ocular frame to hold together the two halves of the outer assembly, fewer parts are required and assembly is simplified. This feature provides a reduction in cost of the binoculars. In addition, the main assembly of the binoculars is designed in such a way as to allow for a separate housing to be placed over it. This means, for example, that without changing the construction of the main assembly, it is possible to change the color and/or outer design by changing the separate housing and rings. The makes it possible to offer products of different designs by simply changing the aforementioned parts. Accordingly, different models with different color designs can be provided without a complicated production process.

What is claimed is:

1. A housing for binoculars comprising: upper and lower housing halves, said halves having objective lens frames and ocular lens frames integrally molded therewith; said objective lens frames and said ocular lens frames projecting outwardly from said upper and lower housing halves with a half of each of said frames being integrally molded with one of said halves and the other half of each of said frames being integrally molded with the other said housing halves and each of said frames having at least one projection formed integrally therewith and ring members each having at least one groove affixed to said objective lens frames and said ocular lens frames with said projections in said grooves for joining said upper and lower halves, said upper and lower halves, when assembled, completely protecting left and right optical systems, a focusing mechanism, and an eyepiece adjustment mechanism of said binoculars.

2. The binoculars housing of claim 1 further comprising chemical bonding means for joining said upper and lower halves.

3. The binoculars housing of claim 1 further comprising transparent protective means disposed in each said objective frame.

4. The binoculars housing of claim 1 wherein one of said upper and lower housing halves has apertures provided therein through which extend an eyepiece width adjustment knob and a focusing knob.

* * * * *